United States Patent
Li et al.

(10) Patent No.: US 12,160,622 B2
(45) Date of Patent: Dec. 3, 2024

(54) VIDEO PROCESSING METHOD AND APPARATUS, DEVICE, AND STORAGE MEDIUM

(71) Applicant: Beijing Zitiao Network Technology Co., Ltd., Beijing (CN)

(72) Inventors: Cheng Li, Beijing (CN); Qin Yu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/540,577

(22) Filed: Dec. 14, 2023

(65) Prior Publication Data

US 2024/0121452 A1 Apr. 11, 2024

Related U.S. Application Data

(63) Continuation of application No. PCT/CN2022/098366, filed on Jun. 13, 2022.

(30) Foreign Application Priority Data

Jun. 23, 2021 (CN) .......................... 202110696038.7

(51) Int. Cl.
*H04N 21/234* (2011.01)
*G06T 5/50* (2006.01)
(Continued)

(52) U.S. Cl.
CPC ......... *H04N 21/23424* (2013.01); *G06T 5/50* (2013.01); *G06V 10/24* (2022.01); *H04N 21/233* (2013.01); *G06T 2207/20221* (2013.01)

(58) Field of Classification Search
CPC .. H04N 21/23424; H04N 21/233; G06T 5/50; G06T 2207/20221; G06V 10/24
See application file for complete search history.

(56) References Cited

U.S. PATENT DOCUMENTS

| 8,934,627 B2 | 1/2015 | Carlson |
| 2016/0225410 A1* | 8/2016 | Lee ................. H04N 21/26258 |
| 2021/0407547 A1* | 12/2021 | Kelly .................. G11B 27/036 |

FOREIGN PATENT DOCUMENTS

| CN | 104936046 A | 9/2015 |
| CN | 104967902 A | 10/2015 |

(Continued)

OTHER PUBLICATIONS

Hannuksela, M., "International Organisation for Standardisation Organisation Internationale De Normalisation ISO/IEC JTC1/SC29/WG11 Coding of Moving Pictures and Audio," Proceedings of ISO/IEC JTC1/SC29/WG11 MPEG2015/N15822, Oct. 2015, Geneva, Switzerland, 10 pages.

(Continued)

*Primary Examiner* — Chenea Davis
(74) *Attorney, Agent, or Firm* — Alleman Hall & Tuttle LLP (57) ABSTRACT

A video processing method and apparatus, a device, a storage medium, and a computer program product are provided. The video processing method includes displaying a combined photographing page in response to a preset combined photographing operation on a target video, the combined photographing page being provided with an album entry; displaying an album page in response to a trigger operation on the album entry; acquiring a user material based on the album page; and generating a combined photographing result video based on the user material and the target video.

19 Claims, 7 Drawing Sheets

(51) Int. Cl.
 *G06V 10/24* (2022.01)
 *H04N 21/233* (2011.01)

(56) References Cited

FOREIGN PATENT DOCUMENTS

| | | | |
|---|---|---|---|
| CN | 108989691 | A | 12/2018 |
| CN | 109862412 | A | 6/2019 |
| CN | 110336968 | A | 10/2019 |
| CN | 110913244 | A | 3/2020 |
| CN | 110996150 | A | 4/2020 |
| CN | 111050070 | A | 4/2020 |
| CN | 111935504 | A | 11/2020 |
| CN | 112637490 | A | 4/2021 |
| CN | 112911379 | A | 6/2021 |
| CN | 113395588 | A | 9/2021 |
| EP | 4262221 | A1 | 10/2023 |
| JP | 2016081319 | A | 5/2016 |
| JP | 2017038344 | A | 2/2017 |

OTHER PUBLICATIONS

European Patent Office, Extended European Search Report Issued in Application No. 22827411.4, Jul. 31, 2024, Germany, 11 pages.
Lonn, S. et al., "Smartphone Picture Organization: A Hierarchical Approach," arXiv: 1803.05940v2, Sep. 6, 2019, 19 pages.

\* cited by examiner

VIDEO PROCESSING METHOD AND APPARATUS, DEVICE, AND STORAGE MEDIUM

This application is a continuation of International Patent Application No. PCT/CN2022/098366, filed on Jun. 13, 2022, which claims the priority to and benefits of Chinese Patent Application No. 202110696038.7, filed on Jun. 23, 2021. All the aforementioned patent applications are hereby incorporated by reference in their entireties.

TECHNICAL FIELD

The present disclosure relates to the field of data processing, in particular to a video processing method, apparatus, device, and storage medium.

BACKGROUND

With the continuous development of multimedia short video technology, the video processing approaches are becoming more and more diversified. A video-based combined photographing function is a popular video processing approach at present. Specifically, a combined photographing function refers to co-recording a finished video using a video selected by a user from an information stream and a camera's framing.

However, the current combined photographing function is so monotonous that it cannot satisfy the user's needs well. Therefore, how to enrich the video-based combined photographing function and improve the user experience is a technical problem urgently to be solved.

SUMMARY

In order to solve or at least partially solve the above technical problem, the embodiments of the present disclosure provide a video processing method, which can achieve the combined photographing effect of the target video selected by the user and the user material on an album page, enriching the video-based combined photographing function, and thus improving the user experience.

In the first aspect, the present disclosure provides a video processing method, which includes:
displaying a combined photographing page in response to a preset combined photographing operation for a target video;
displaying an album page in response to a trigger operation for the album entry;
acquiring a user material based on the album page;
generating a combined photographing result video based on the user material and the target video. The combined photographing page is provided with the album entry.

In an alternative implementation, the user material includes a video material, and the generating a combined photographing result video based on the user material and the target video includes:
aligning the first frame of the video material with the first frame of the target video, and obtaining the combined photographing result video by synthesizing the video material and the target video, taking the shorter duration between the duration of the video material and the duration of the target video as the combined photographing duration.

In an alternative implementation, the user material includes a video material, and the generating a combined photographing result video based on the user material and the target video includes:
determining, on a video clipping page, based on a clipping standard box, video frames to be synthesized in the video material and the target video respectively;
synthesizing the video frames to be synthesized in the video material and the target video to obtain the combined photographing result video. The clipping standard box is determined based on the shorter duration between the duration of the video material and the duration of the target video, and the duration corresponding to the video frames to be synthesized is greater than a preset duration threshold.

In an alternative implementation, before determining, on the video clipping page based on the clipping standard box, the video frames to be synthesized in the video material and the target video respectively, the method further includes:
displaying the target video and the video material on a video editing page respectively; and
jumping from the video editing page to the video clipping page in response to a trigger operation on the video clipping entry. The video editing page is provided with the video clipping entry.

In an alternative implementation, the video clipping entry on the video editing page is in a displayed state in a case where the duration of the target video is less than the duration of the user material.

In an alternative implementation, the video editing page is further provided with a volume adjusting control, and the method further includes:
displaying a volume adjusting panel in response to a trigger operation on the volume adjusting control;
adjusting, based on the channels respectively corresponding to the video material and the target video, the volumes of the video material and the target video respectively. The volume adjusting panel is provided with channels respectively corresponding to the video material and the target video.

In an alternative implementation, the user material includes an image material, and the generating a combined photographing result video based on the user material and the target video includes:
synthesizing the image material respectively with each frame of video pictures in the target video to obtain the combined photographing result video.

In an alternative implementation, after the displaying a combined photographing page in response to a preset combined photographing operation for a target video, the method further includes:
starting timing upon receiving a trigger operation on a photographing control on the combined photographing page, and switching the current state of the album entry on the combined photographing page from the displayed state to the hidden state in the case where the timing reaches a preset time threshold.

In an alternative implementation, the combined photographing page is provided with a layout control, and the method further includes:
determining a display layout mode on the combined photographing page in response to a trigger operation on the layout control;
accordingly, the generating a combined photographing result video based on the user material and the target video includes:
displaying, according to the display layout mode, the user material and the target video on the video editing page respectively;

generating, based on the video editing page, the combined photographing result video for the user material and the target video.

In an alternative implementation, the video editing page includes at least two display regions determined based on the display layout mode, and after the displaying, according to the display layout mode, the user material and the target video on the video editing page respectively, the method further includes:

moving, within the display region, a display object in the display regions in response to a preset dragging operation for any one of the at least two display regions.

In an alternative implementation, the display layout mode includes a green screen layout mode, and the displaying, according to the display layout mode, the user material and the target video on the video editing page respectively includes:

performing portrait matting on the user material in the case where the display layout mode is the green screen layout mode, to obtain a matting result corresponding to the user material; and displaying the matting result corresponding to the user material and the target video on the video editing page respectively.

In the second aspect, the present disclosure further provides a video processing apparatus, which includes the first display module, the second display module, the first acquisition module, and the first generation module.

The first display module is configured to display a combined photographing page in response to a preset combined photographing operation for a target video. The combined photographing page is provided with an album entry.

The second display module is configured to display an album page in response to a trigger operation on the album entry.

The first acquisition module is configured to acquire a user material based on the album page.

The first generation module is configured to generate a combined photographing result video based on the user material and the target video.

In the third aspect, the present disclosure provides a computer-readable storage medium having stored therein instructions, which, when executed on a terminal device, cause the terminal device to implement the above method.

In the fourth aspect, the present disclosure provides a device which includes a memory, a processor, and a computer program stored in the memory and executable on the processor. The computer program, when executed by the processor, implements the above method.

In the fifth aspect, the present disclosure provides a computer program product which includes computer programs/instructions which, when executed by a processor, implement the above method.

Compared with the prior art, the technical scheme provided by the embodiments of the present disclosure has the following advantages.

The embodiments of the present disclosure provide a video processing method, which includes specifically: displaying a combined photographing page upon receiving a preset combined photographing operation for a target video; displaying an album page in response to a trigger operation for the album entry; and then acquiring a user material based on the album page, so as to generate a combined photographing result video based on the user material and the target video. The combined photographing page is provided with an album entry. It can be seen that the video processing method provided by the embodiments of the present disclosure can achieve the combined photographing effect of the target video and the user material selected from the album page on the basis of the combined photographing function, which enriches the video-based combined photographing function, and thus improves the user experience.

BRIEF DESCRIPTION OF DRAWINGS

The accompanying drawings herein, which are incorporated in the specification and constitute a part thereof, illustrate embodiments conforming to the present disclosure and together with the description, serve to explain the principles of the present disclosure.

In order to illustrate the technical schemes in the embodiments of the present disclosure or the prior art more clearly, the drawings needed in the description of the embodiments or the prior art will be briefly introduced below. Apparently, it is possible for those ordinary skilled in the art to obtain further drawings according to the accompanying drawings without paying creative labor.

DETAILED DESCRIPTION

In order to understand the above objectives, features and advantages of the present disclosure more clearly, the schemes of the present disclosure will be further described below. It should be noted that the embodiments of the present disclosure and the features in the embodiments can be combined with each other without conflict.

In the following description, many specific details are set forth in order to fully understand the present disclosure, but the present disclosure may be implemented in other ways than those described herein. Apparently, the embodiments in the specification are only part of the embodiments of the present disclosure, not all of the embodiments.

In order to enrich the video-based combined photographing function and thus to enrich the video processing approaches and improve the user experience, the embodiments of the present disclosure propose a video processing method, which includes specifically: displaying a combined photographing page upon receiving a preset combined photographing operation for a target video; displaying an album page in response to a trigger operation for the album entry; acquiring a user material based on the album page, and then generating a combined photographing result video based on the user material and the target video. The combined photographing page is provided with an album entry. It can be seen that the embodiments of the present disclosure can synthesize the target video and the user material selected from the album page into a combined photographing result video, which enriches the video-based combined photographing function and improves the user experience.

Figure 1:
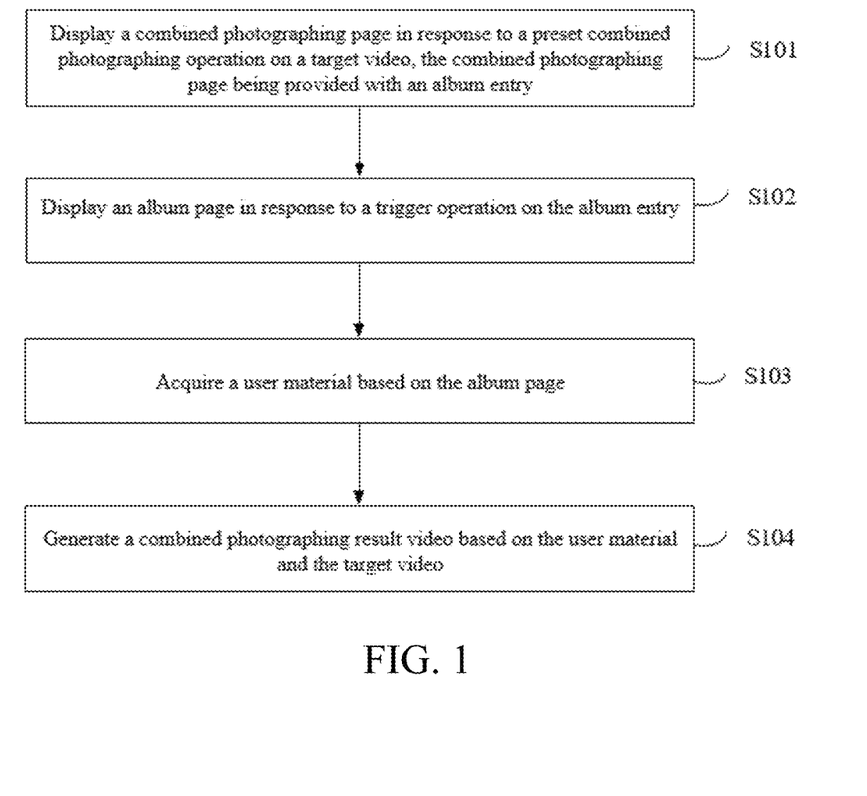
FIG. 1 is a flowchart of a video processing method provided by an embodiment of the present disclosure.

Based on this, the embodiments of the present disclosure provide a video processing method. Referring to FIG. 1, FIG. 1 is a flowchart of a video processing method provided by an embodiment of the present disclosure. The method includes:

S101: displaying a combined photographing page in response to a preset combined photographing operation on a target video.

The combined photographing page is provided with an album entry.

The target video in the embodiments of the present disclosure may be a video in an information stream. For example, the target video is a video in a recommended video stream. The preset combined photographing operation may be any preset operation for triggering the combined photographing. For example, the preset combined photographing operation may be an operation of clicking on a combined photographing control on the playing page for the target video.

Figure 2:
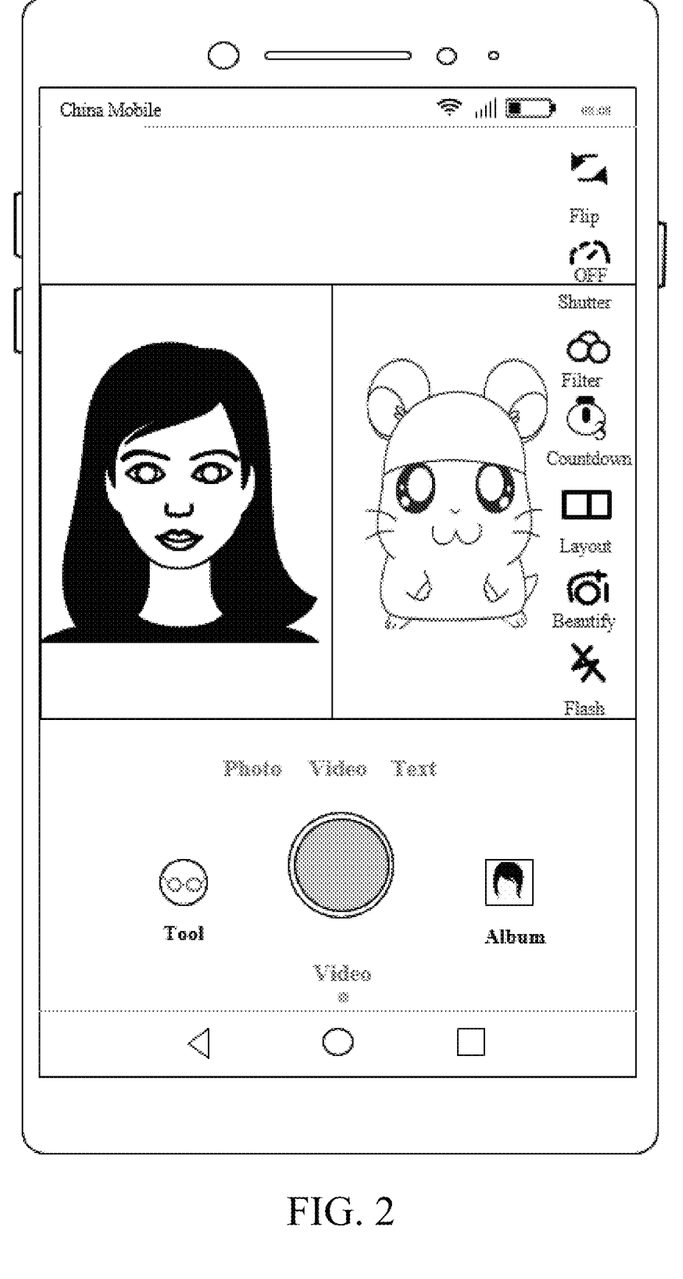
FIG. 2 is a schematic diagram of a combined photographing page provided by an embodiment of the present disclosure.

In the practical applications, upon receiving the preset combined photographing operation for the target video, the combined photographing page is firstly exhibited. As illustrated in FIG. 2, FIG. 2 is a schematic diagram of a combined photographing page provided by an embodiment of the present disclosure. The combined photographing page is provided with an album entry, which is used for entering an album page of the current user. Additionally, the combined photographing page includes two display regions, one display region of the two display regions is used to display the target video, and the other display region of the two display regions is used for the camera to frame. The combined photographing page is further provided with video effect processing controls, such as "filter", "beautify", and etc. The effects of the contents displayed in the above two display regions of the combined photographing page may be processed by clicking on the above video effect processing controls.

In an alternative implementation, the combined photographing page is further provided with a photographing control (also referred to as a photographing button), as illustrated in FIG. 2. The camera may be triggered to start photographing by clicking on the photographing control, so as to implement the combined photographing of the target video and the material captured by the camera. According to an embodiment of the present disclosure, upon receiving a trigger operation for the photographing control on the combined photographing page, the camera is triggered to start photographing and start timing at the same time. When the timing reaches a preset time threshold, the current state of the album entry on the combined photographing page is switched from a displayed state to a hidden state.

In the embodiments of the present disclosure, on the combined photographing page, once the user shoots a material by the camera and triggers the combined photographing function of the shot material and the target video, the album entry on the combined photographing page is hidden. In this case, the user cannot trigger, based on the combined photographing page, the combined photographing function of the user material selected from the album page and the target video.

S102: displaying an album page in response to a trigger operation on the album entry.

In an embodiment of the present disclosure, upon receiving the trigger operation for the album entry on the combined photographing page, the combined photographing page jumps to the album page. The album page exhibits the materials of the current user, which specifically include video materials and image (e.g. photograph) materials of the current user.

Figure 3:
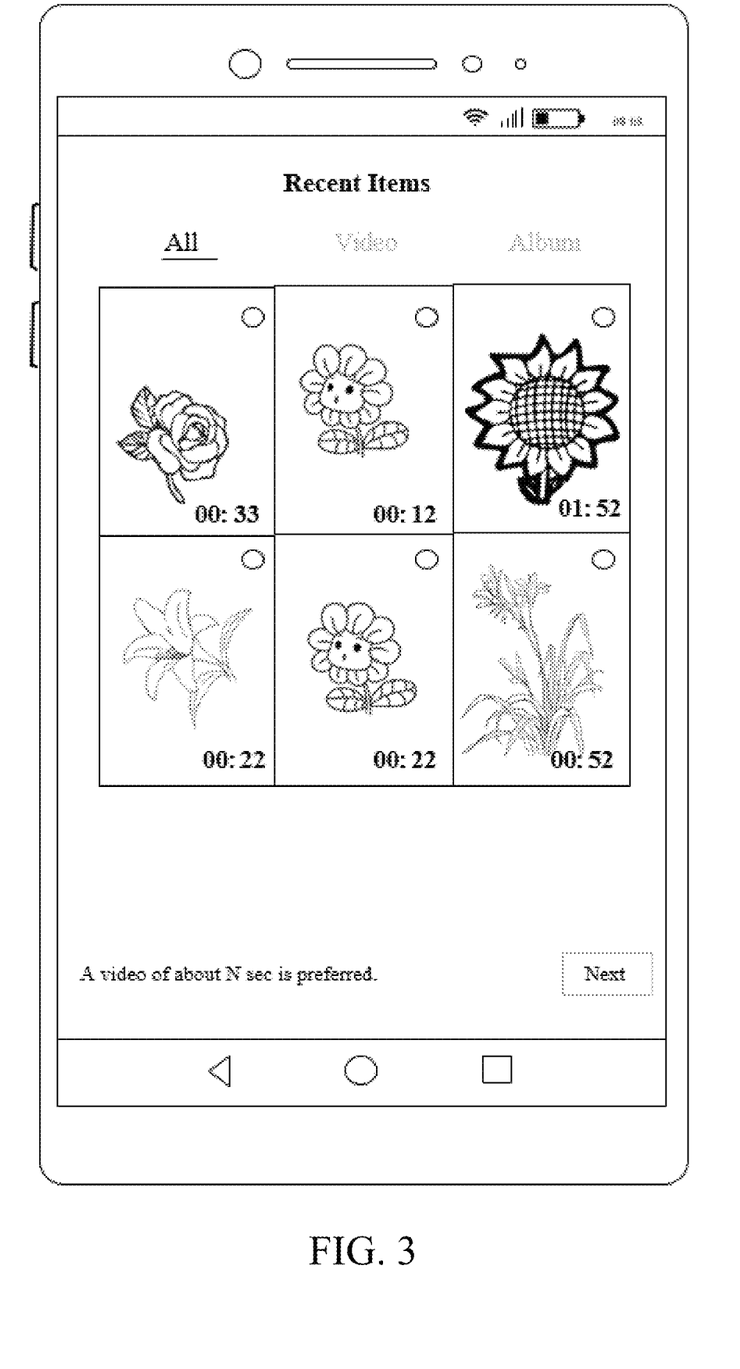
FIG. 3 is a schematic diagram of an album page provided by an embodiment of the present disclosure.

As illustrated in FIG. 3, FIG. 3 is a schematic diagram of an album page provided by an embodiment of the present disclosure. Specifically, a user material may be selected from the materials displayed on the album page to implement the combined photographing function with the target video.

S103: acquiring a user material based on the album page.

In an embodiment of the present disclosure, the album page may exhibit the video materials and image materials of the current user, and the material selected by the user from the album page may be a video material or an image material.

In an alternative implementation, for the combined photographing function, the album page may only support selecting one material for the target video, such as a segment of video or a piece of image, so as to implement the combined photographing function of the selected material and the target video.

In another alternative implementation, for the combined photographing function, the album page may also support selecting a plurality of materials for the target video, such as two materials, e.g., two segments of videos, or a segment of video and a piece of image, and so on, so as to implement the combined photographing function of the selected two materials and the target video.

In the embodiments of the present disclosure, in order to facilitate the user to select an appropriate material, a material selection prompt message may be displayed on the album page, such as "[a] video of about N sec is preferred" as illustrated in FIG. 3, for guiding the user to select a video material of about N seconds. N seconds is the duration of the target video. In fact, the user selects a material of duration similar to that of the target video, facilitating the subsequent generation of the combined photographing result video.

In an alternative implementation, the target video may be automatically matched to a corresponding user material, based on the materials exhibited on the album page. For example, a user material is automatically determined as a material in combined photographing with the target video from the materials exhibited on the album page, based on the features of the target video.

S104: generating a combined photographing result video based on the user material and the target video.

In an embodiment of the present disclosure, after the user material corresponding to the target video is acquired, a combined photographing result video is generated based on the user material and the target video.

In an alternative implementation, assuming that the selected user material includes a video material, then the first frame of the user material may be aligned with the first frame of the target video, and the video material and the target video may be synthesized by taking the shorter duration of the duration of the user material and the duration of the target video as the combined photographing duration, to obtain the combined photographing result video.

For example, assuming that the duration of the target video is 15 s and the duration of the user material is 5 s, the first frame of the target video and the first frame of the user material are aligned based on the above method, and the shorter duration of 5 s is taken as the combined photographing duration in order to obtain the combined photographing result video. The duration of the combined photographing result video is 5 s, while the combined photographing result video does not include the last 10 s in the target video, that is, the contents for the last 10 s in the target video are discarded.

In another alternative implementation, in the case where the user material includes a video material, the user material or the target material may be clipped based on a video clipping page, so as to generate the combined photographing result video. The specific implementation is introduced in the following embodiments, and will not be repeated here.

In another alternative implementation, assuming that the selected user material includes an image material, the user material may be synthesized respectively with each frame of video pictures in the target video to obtain the combined photographing result video.

The video processing method provided by the embodiments of the present disclosure includes: displaying a combined photographing page firstly upon receiving a preset combined photographing operation for a target video; then displaying an album page upon receiving a trigger operation for the album entry; acquiring a user material corresponding to the target video based on the album page; and generating a combined photographing result video based on the user material and the target video. The combined photographing page is provided with an album entry. It can be seen that the video processing method provided by the embodiments of the present disclosure can achieve the combined photographing effect of the target video and the user material selected from the album page on the basis of the combined photographing function, which enriches the combined photographing function, and thus improves the user experience.

On the basis of the above embodiments, the embodiments of the present disclosure further provide a video clipping method, which includes specifically: after obtaining the user material corresponding to the target video based on the album page, jumping from the album page to a video editing page in response to a trigger operation on the "[n]ext" control on the album page as illustrated in FIG. 3.

Figure 4:
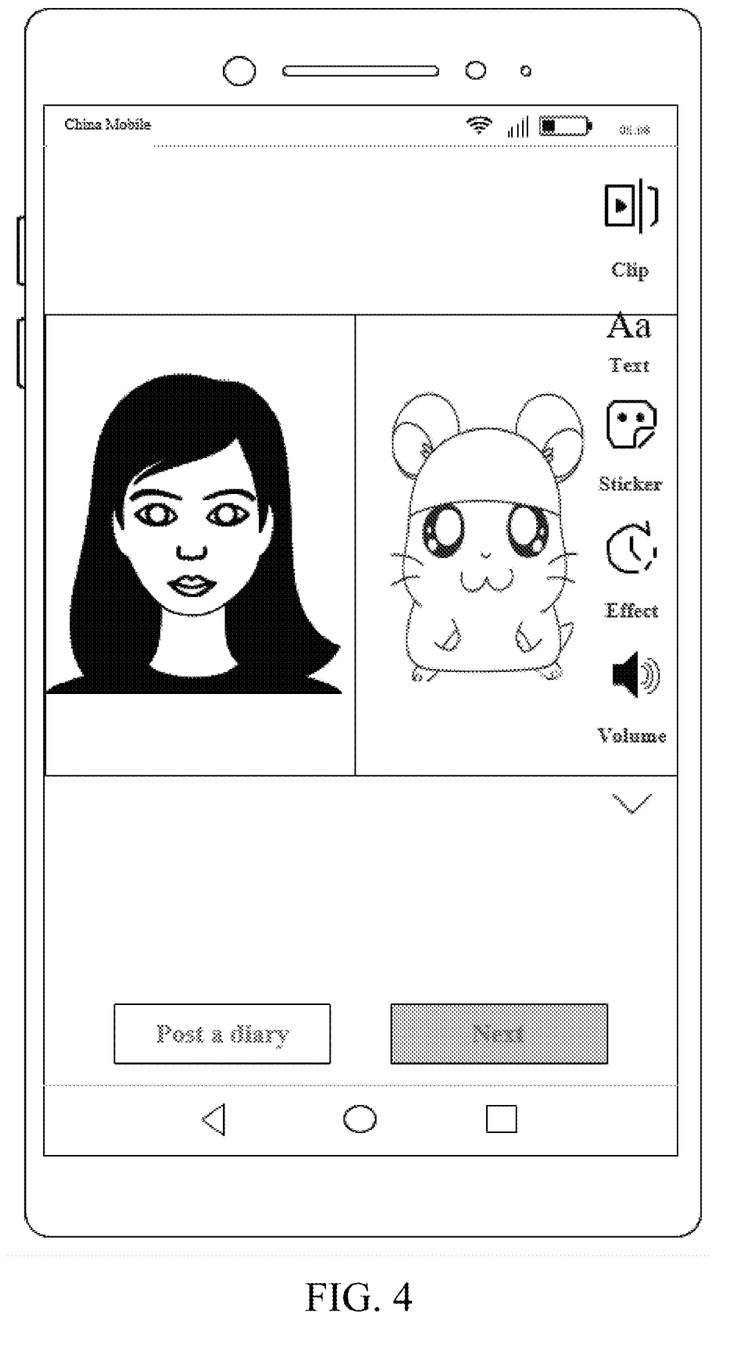
FIG. 4 is a schematic diagram of a video editing page provided by an embodiment of the present disclosure.

Referring to FIG. 4, FIG. 4 is a schematic diagram of a video editing page provided by an embodiment of the present disclosure. The target video and the selected user material are displayed on the video editing page respectively. Additionally, the video editing page is provided with a video clipping entry. Upon receiving a trigger operation for the video clipping entry, the video editing page jumps to the video clipping page to implement a clipping function for the target video and the user material.

Figure 5:
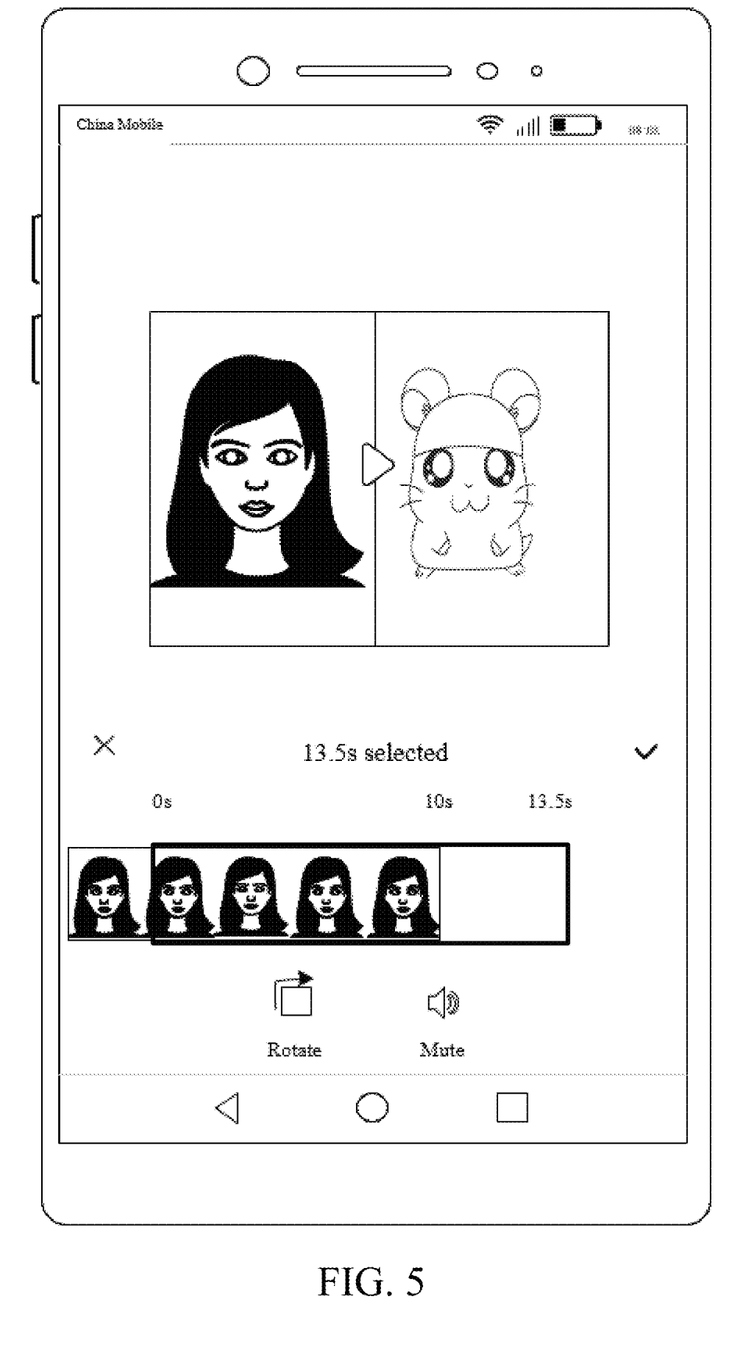
FIG. 5 is a schematic diagram of a video clipping page provided by an embodiment of the present disclosure.

As illustrated in FIG. 5, FIG. 5 is a schematic diagram of a video clipping page provided by an embodiment of the present disclosure. The video frames to be synthesized in the user material and the target video may be determined respectively on a video clipping page based on a clipping standard box, and the video frames to be synthesized in the user material and the target video are synthesized to obtain the combined photographing result video. The clipping standard box is determined based on the shorter duration of the duration of the user material and the duration of the target video, and the duration corresponding to the video frames to be synthesized is greater than a preset duration threshold. The preset duration threshold may be 1 s, for example.

Additionally, the video clipping page is provided with a preview window. In the process of clipping the user material and the target video, the clipping result may be previewed in real time to determine whether it satisfies the clipping requirements.

In the practical applications, the user may drag a frame picture in a relatively long video, so that the video frame picture required to be synthesized into the combined photographing result video is in the clipping standard box.

For example, assuming that the duration of the target video is shorter in the duration of the user material and the duration of the target video, the clipping standard box is determined based on the duration of the target video. As illustrated in FIG. 5, the duration of the target video is 13.5 s, and thus the length of the clipping standard box corresponds to 13.5 s. The user drags the video frame picture in the user material, so that the video frame picture required to be synthesized into the combined photographing result video is in the clipping standard box. As illustrated in FIG. 5, the video frame picture of the user material in the clipping standard box corresponds to 0 s-10 s of the target video. That is, the video frames of 0 s-10 s in the target video is considered as the video frames to be synthesized which are to be synthesized with the video frames to be synthesized of the user material in the clipping standard box, so as to obtain a combined photographing result video with the duration of 10 s.

In an alternative implementation, in the case where the duration of the target video is less than the duration of the user material, the video clipping entry on the video editing page may be set to a displayed state, and the user can clip the user material and the target video based on the video clipping page. On the contrary, in the case where the duration of the target video is not less than the duration of the user material, the video clipping entry on the video editing page may be set to a hidden state. In this case, the user cannot clip the user material and the target video based on the video clipping page. Instead, the user aligns the first frame of the user material with the first frame of the target video, and synthesizes the user material and the target video by taking the shorter duration of the duration of the user material and the duration of the target video as the combined photographing duration.

In practical applications, after the user material and the target video are clipped based on the video clipping page, the video clipping page may jump back to the video editing page by triggering a clipping completion operation, as illustrated in FIG. 4. The video editing page may be further provided with the editing controls such as "[s]ticker", "[e]ffect", and etc., and the user may further edit the synthesized result video based on the respective editing controls.

Additionally, the video editing page may be further provided with a volume adjusting control, and upon receiving a trigger operation for the volume adjusting control, a volume adjusting panel is exhibited on the video editing page. The volume adjusting panel is provided with channels respectively corresponding to the user material and the target video. The volume of the user material may be adjusted based on the channel corresponding to the user material, while the volume of target video may be adjusted based on the channel corresponding to the target video.

The embodiments of the present disclosure can achieve the combined photographing effect of the target video and the user material selected from the album page on the basis of the combined photographing function, which enriches the combined photographing function, and thus improves the user experience.

Further, the embodiments of the present disclosure can also clip for the target video and the user material to obtain a clipping result for synthesizing a result video.

On the basis of the above embodiments, the combined photographing page in the embodiments of the present disclosure is further provided with a layout control. As illustrated in FIG. 2, upon receiving a trigger operation for the layout control, a display layout mode on the combined photographing page is determined. The display layout mode may include left-to-right layout mode, up-to-down layout mode, scene-stealing layout mode, green screen layout mode, and so on. Then, according to the display layout mode on the combined photographing page, the user material and the target video are displayed on the video editing page respectively. Based on the video editing page, the combined photographing result video is generated for the user material and the target video.

In practical applications, the display layout mode determined on the combined photographing page affects the display layout mode of the user material and the target video on the video editing page. The display layout mode on the combined photographing page as illustrated in FIG. 2 is left-to-right layout mode, then the display layout mode of the user material and the target video on the video editing page as illustrated in FIG. 4 is also left-to-right layout mode.

In an alternative implementation, the video editing page may include at least two display regions determined based on the display layout mode. Specifically, upon receiving a preset dragging operation for any one of the display regions, a display object in the display region is moved within the display region. According to the embodiment of the present disclosure, the display object in the display region is displayed and positioned by moving the display object in the display region, which improves the display effect in the display region.

Figure 6:
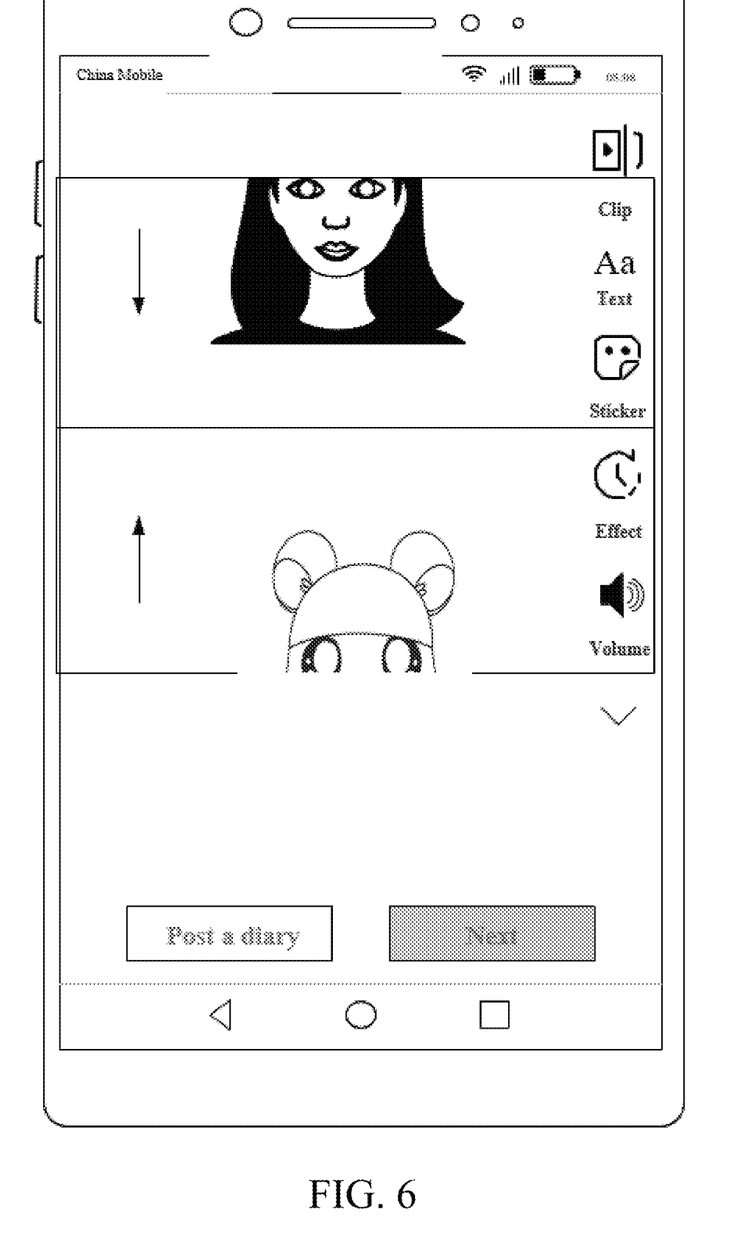
FIG. 6 is a schematic diagram of another video editing page provided by an embodiment of the present disclosure.

As illustrated in FIG. 6, FIG. 6 is a schematic diagram of another video editing page provided by an embodiment of the present disclosure. In FIG. 6, the display layout mode on the video editing page is up-to-down layout mode. Since the avatar in the display region is not displayed in the area, the avatar may be moved to the display region by triggering the preset dragging operation in the display region, which improves the display effect. For example, on the video editing page as illustrated in FIG. 6, the avatar in the upper display region moves downward, whereas the avatar in the lower display region moves upwards, thereby improving the display effect.

In an alternative implementation, the display layout mode may include a green screen layout mode. Specifically, in the case where the display layout mode is the green screen layout mode, when the album page jumps to the video editing page after selecting the user material, the portrait matting is performed on the selected user material, in order to obtain a matting result, and the matting result corresponding to the user material and the target video are displayed on the video editing page respectively. Specifically, the matting result may be displayed on the upper layer of the target video, and the content in the target video serves as the background of the matting result.

It should be noted that, generally, before selecting a user material including an avatar, the layout mode may be determined as the green screen layout mode on the combined photographing page to ensure the display effect of the combined photographing result video.

Figure 7:
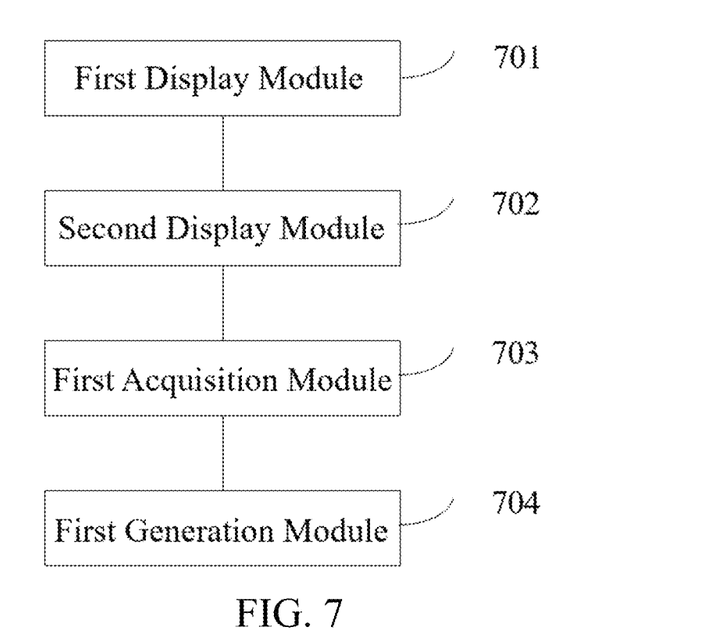
FIG. 7 is a structural schematic diagram of a video processing apparatus provided by an embodiment of the present disclosure.

Based on the above method embodiment, the present disclosure further provides a video processing apparatus. Referring to FIG. 7, FIG. 7 is a structural schematic diagram of a video processing apparatus provided by an embodiment of the present disclosure, and the apparatus includes the first display module 701, the second display module 702, the first acquisition module 703, and the first generation module 704.

The first display module 701 is configured to display a combined photographing page in response to a preset combined photographing operation on a target video. The combined photographing page is provided with an album entry.

The second display module 702 is configured to display an album page in response to a trigger operation on the album entry.

The first acquisition module 703 is configured to acquire a user material based on the album page.

The first generation module 704 is configured to generate a combined photographing result video based on the user material and the target video.

In an alternative implementation, the user material includes a video material, and the first generation module 704 is specifically configured to:

align the first frame of the user material with the first frame of the target video, and synthesize the user material and the target video by taking the shorter duration of the duration of the user material and the duration of the target video as a combined photographing duration, to obtain the combined photographing result video.

In an alternative implementation, the user material includes a video material, and the first generation module 704 includes the first determination sub-module and the first synthesis sub-module.

The first determination sub-module is configured to determine, on a video clipping page based on a clipping standard box, video frames to be synthesized in the user material and the target video respectively. The clipping standard box is determined based on the shorter duration of the duration of the user material and the duration of the target video, and the duration corresponding to the video frames to be synthesized is greater than a preset duration threshold.

The first synthesis sub-module is configured to synthesize the video frames to be synthesized in the user material and the target video to obtain the combined photographing result video.

In an alternative implementation, the apparatus further includes the third display module and a jump module.

The third display module is configured to display the target video and the user material on a video editing page respectively. The video editing page is provided with a video clipping entry.

The jump module is configured to jump from the video editing page to the video clipping page in response to a trigger operation on the video clipping entry.

In an alternative implementation, the video clipping entry on the video editing page is in a displayed state in the case where the duration of the target video is less than the duration of the user material.

In an alternative implementation, the video editing page is further provided with a volume adjusting control, and the apparatus further includes an exhibition module and an adjustment module.

The exhibition module is configured to display a volume adjusting panel in response to a trigger operation for the volume adjusting control. The volume adjusting panel is provided with channels respectively corresponding to the user material and the target video.

The adjustment module is configured to adjust, based on the channels respectively corresponding to the user material and the target video, volumes of the user material and the target video respectively.

In an alternative implementation, the user material includes an image material, and the first generation module is specifically configured to:

synthesizing the user material respectively with each frame of video pictures in the target video to obtain the combined photographing result video.

In an alternative implementation, the apparatus further includes a switching module.

The switching module is configured to start timing upon receiving a trigger operation on a photographing control on the combined photographing page, and switch the current state of the album entry on the combined photographing page from a displayed state to a hidden state in the case where the timing reaches a preset time threshold.

In an alternative implementation, the combined photographing page is further provided with a layout control, and the apparatus further includes the first determination module.

The first determination module is configured to determine a display layout mode on the combined photographing page in response to a trigger operation for the layout control.

Accordingly, the first generation module includes the first display sub-module and the first generation sub-module.

The first display sub-module is configured to display, according to the display layout mode, the user material and the target video on the video editing page respectively.

The first generation sub-module is configured to generate, based on the video editing page, the combined photographing result video for the user material and the target video.

In an alternative implementation, the video editing page includes at least two display regions determined based on the display layout mode, and the apparatus further includes a moving module.

The moving module is configured to move, within the display region, a display object in the display regions in response to a preset dragging operation for any one of the at least two display regions.

In an alternative implementation, the display layout mode includes a green screen layout mode, and the first display sub-module includes a matting sub-module and the second display sub-module.

The matting sub-module is configured to perform portrait matting on the user material in the case where the display layout mode is the green screen layout mode, to obtain a matting result corresponding to the user material.

The second display sub-module is configured to display the matting result corresponding to the user material and the target video on the video editing page respectively.

The video processing apparatus provided by the embodiments of the present disclosure is configured to: display a combined photographing page first upon receiving a preset combined photographing operation for a target video; then display an album page upon receiving a trigger operation for the album entry; acquire a user material corresponding to the target video based on the album page, and generate a combined photographing result video based on the user material and the target video. The combined photographing page is provided with an album entry. It can be seen that the video processing apparatus provided by the embodiments of the present disclosure can achieve the combined photographing effect of the target video and the user material selected from the album page on the basis of the combined photographing function, which enriches the combined photographing function, and thus improves the user experience.

In addition to the above method and apparatus, the embodiments of the present disclosure further provide a computer-readable storage medium having stored therein instructions which, when executed on a terminal device, cause the terminal device to implement the video processing method described in the embodiments of the present disclosure.

The embodiments of the present disclosure further provide a computer program product which includes computer programs/instructions. The computer programs/instructions, when executed by a processor, cause the processor to implement the video processing method described in the embodiments of the present disclosure.

Figure 8:
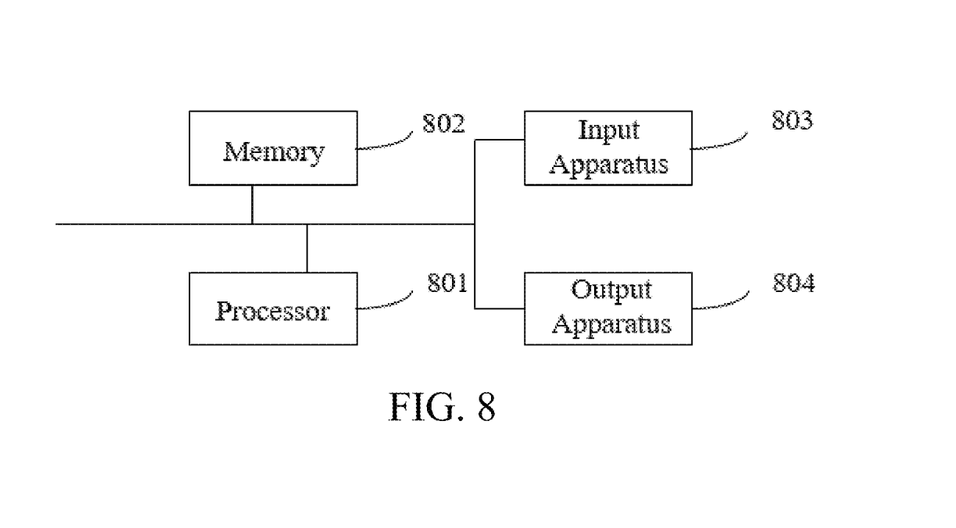
FIG. 8 is a structural schematic diagram of a video processing device provided by an embodiment of the present disclosure.

Additionally, the embodiments of the present disclosure further provide a video processing device, as illustrated in FIG. 8, which includes a processor 801, a memory 802, an input apparatus 803, and an output apparatus 804.

The number of processors 801 in the video processing device may be one or more, and FIG. 8 illustrates one processor as an example. In some embodiments of the present disclosure, the processor 801, the memory 802, the input apparatus 803, and the output apparatus 804 may be connected via a bus or by other means. FIG. 8 illustrates a connection via a bus as an example.

The memory 802 may be configured to store software programs and modules, and the processor 801 may perform various functional applications and data processing for the video processing device by executing the software programs and modules stored in the memory 802. The memory 802 may mainly include a storage program region and a storage data region, the storage program region may store an operating system, application programs required by at least one function, and the like. In addition, the memory 802 may include high-speed random access memory, or may include non-volatile memory, such as at least one disk memory device, flash memory device, or other volatile solid-state memory devices. The input apparatus 803 may be configured to receive input digital or character information and generate signal input related to user settings and functional control of the video processing device.

Specifically, in this embodiment, the processor 801 may load the executable files corresponding to the processes of one or more application programs into the memory 802 according to the following instructions, and the processor 801 may execute the application programs stored in the memory 802 to implement various functions of the above video processing device.

It should be noted that, herein, relational terms such as "first", "second" etc., are merely used to distinguish one entity or operation from another, and do not necessarily require or imply that there is any such actual relationship or order between these entities or operations. Moreover, the terms "include", "comprise" or any other variation thereof are intended to encompass non-exclusive inclusion, so that a process, method, article or device including a series of elements includes not only those elements, but also other elements not explicitly listed or elements inherent to such process, method, article or device. Without further limitations, an element defined by the phrase "including a/an . . . " does not exclude the existence of additional identical elements in the process, method, article or device including the said element.

What has been described above is only the specific implementations of the present disclosure, so that those skilled in the art can understand or implement the present disclosure. Many modifications to these embodiments will be obvious to those skilled in the art, and the general principles defined herein can be implemented in other embodiments without departing from the spirit or scope of the present disclosure. Therefore, the present disclosure will not be limited to the embodiments described herein, but is to conform to the widest scope consistent with the principles and novel features disclosed herein.

What is claimed is:

1. A video processing method, comprising:
displaying a combined photographing page in response to a preset combined photographing operation on a target video, wherein the combined photographing page is provided with an album entry;
displaying an album page in response to a trigger operation on the album entry;
acquiring a user material based on the album page; and
generating a combined photographing result video based on the user material and the target video, wherein
the combined photographing page is further provided with a layout control, and the method further comprises:
determining a display layout mode on the combined photographing page in response to a trigger operation on the layout control, and
generating the combined photographing result video based on the user material and the target video comprises:
displaying, according to the display layout mode, the user material and the target video on a video editing page; and
generating, based on the video editing page, the combined photographing result video for the user material and the target video.

2. The video processing method according to claim 1, wherein the user material comprises a video material, and generating the combined photographing result video based on the user material and the target video comprises:
aligning a first frame of the video material with a first frame of the target video, and
obtaining the combined photographing result video by synthesizing the video material and the target video, wherein a shorter one of duration of the video material and duration of the target video is taken as combined photographing duration for the combined photographing result video.

3. The video processing method according to claim 1, wherein the user material comprises a video material, and generating the combined photographing result video based on the user material and the target video comprises:
determining, on a video clipping page, based on a clipping standard box, video frames to be synthesized in the video material and the target video respectively, wherein the clipping standard box is determined based on shorter duration between duration of the video material and duration of the target video, and duration corresponding to the video frames to be synthesized is greater than a preset duration threshold; and
synthesizing the video frames to be synthesized in the video material and the target video to obtain the combined photographing result video.

4. The video processing method according to claim 3, wherein before determining, on the video clipping page, based on the clipping standard box, video frames to be synthesized in the video material and the target video respectively, the method further comprises:

displaying the target video and the video material on the video editing page respectively, wherein the video editing page is provided with a video clipping entry; and
jumping from the video editing page to the video clipping page in response to a trigger operation on the video clipping entry.

5. The video processing method according to claim 4, wherein the video clipping entry on the video editing page is in a displayed state in a case where the duration of the target video is less than the duration of the user material.

6. The video processing method according to claim 4, wherein the video editing page is further provided with a volume adjusting control, and the method further comprises:
displaying a volume adjusting panel in response to a trigger operation on the volume adjusting control; wherein the volume adjusting panel is provided with channels respectively corresponding to the video material and the target video; and
adjusting, based on the channels respectively corresponding to the video material and the target video, volumes of the video material and the target video, respectively.

7. The video processing method according to claim 1, wherein the user material comprises an image material, and generating the combined photographing result video based on the user material and the target video comprises:
synthesizing the image material respectively with each frame of video pictures in the target video to obtain the combined photographing result video.

8. A video processing method, comprising,
displaying a combined photographing page in response to a preset combined photographing operation on a target video, wherein the combined photographing page is provided with an album entry;
displaying an album page in response to a trigger operation on the album entry;
acquiring a user material based on the album page; and
generating a combined photographing result video based on the user material and the target video, wherein
after displaying the combined photographing page in response to the preset combined photographing operation on the target video, the method further comprises:
starting timing upon receiving a trigger operation on a photographing control on the combined photographing page, and
switching a current state of the album entry on the combined photographing page from a displayed state to a hidden state in response to the timing reaching a preset time threshold.

9. The video processing method according to claim 1, wherein
the video editing page comprises at least two display regions determined based on the display layout mode, and
after displaying, according to the display layout mode, the user material and the target video on the video editing page, respectively, the method further comprises:
moving, in response to a preset dragging operation for one display region of the at least two display regions, a display object in the display region within the display region.

10. The video processing method according to claim 1, wherein
the display layout mode comprises a green screen layout mode, and
displaying, according to the display layout mode, the user material and the target video on the video editing page comprises:
performing portrait matting on the user material in a case where the display layout mode is the green screen layout mode, to obtain a matting result corresponding to the user material; and
displaying the matting result corresponding to the user material and the target video on the video editing page.

11. An electronic device, comprising:
a processor; and
a storage apparatus, configured to store instructions,
wherein the instructions, upon execution by the processor, cause the processor to:
display a combined photographing page in response to a preset combined photographing operation on a target video, wherein the combined photographing page is provided with an album entry;
display an album page in response to a trigger operation on the album entry;
acquire a user material based on the album page; and
generate a combined photographing result video based on the user material and the target video, wherein
the combined photographing page is further provided with a layout control, and the instructions, upon execution by the processor, cause the processor to further: determine a display layout mode on the combined photographing page in response to a trigger operation on the layout control, and
generating the combined photographing result video based on the user material and the target video comprises: displaying, according to the display layout mode, the user material and the target video on a video editing page; and generating, based on the video editing page, the combined photographing result video for the user material and the target video.

12. A non-transitory computer-readable storage medium having stored therein instructions which, when executed on a terminal device, cause the terminal device to implement the method according to claim 1.

13. A device comprising a memory, a processor, and a computer program stored in the memory and executable by the processor, wherein the computer program, when executed by the processor, causes the processor to implement the method according to claim 1.

14. The electronic device according to claim 11, wherein the user material comprises a video material, and generating the combined photographing result video based on the user material and the target video comprises:
aligning a first frame of the video material with a first frame of the target video, and
obtaining the combined photographing result video by synthesizing the video material and the target video, wherein a shorter one of duration of the video material and duration of the target video is taken as combined photographing duration for the combined photographing result video.

15. The electronic device according to claim 11, wherein the user material comprises a video material, and
generating the combined photographing result video based on the user material and the target video comprises:
determining, on a video clipping page, based on a clipping standard box, video frames to be synthesized in the video material and the target video respectively, wherein the clipping standard box is determined based on shorter duration between duration of the video material and duration of the target video, and duration corresponding to the video frames to be synthesized is greater than a preset duration threshold; and
synthesizing the video frames to be synthesized in the video material and the target video to obtain the combined photographing result video.

16. The electronic device according to claim 15, wherein the instructions, upon execution by the processor, cause the processor to further:
display the target video and the video material on the video editing page respectively, wherein the video editing page is provided with a video clipping entry; and
jump from the video editing page to the video clipping page in response to a trigger operation on the video clipping entry.

17. The electronic device according to claim 16, wherein the video clipping entry on the video editing page is in a displayed state in a case where the duration of the target video is less than the duration of the user material.

18. The electronic device according to claim 16, wherein the video editing page is further provided with a volume adjusting control, and
the instructions, upon execution by the processor, cause the processor to further:
display a volume adjusting panel in response to a trigger operation on the volume adjusting control, wherein the volume adjusting panel is provided with channels respectively corresponding to the video material and the target video; and
adjust, based on the channels respectively corresponding to the video material and the target video, volumes of the video material and the target video, respectively.

19. The video processing method according to claim 1, wherein after displaying the combined photographing page in response to the preset combined photographing operation on the target video, the method further comprises:
starting timing upon receiving a trigger operation on a photographing control on the combined photographing page, and
switching a current state of the album entry on the combined photographing page from a displayed state to a hidden state in response to the timing reaching a preset time threshold.

* * * * *